US012650775B2

(12) United States Patent
Zhang et al.

(10) Patent No.: US 12,650,775 B2
(45) Date of Patent: Jun. 9, 2026

(54) TIERING-AWARE REPLICATION FOR MULTIPLE-TIER STORAGE SYSTEMS

(71) Applicant: Dell Products L.P., Round Rock, TX (US)

(72) Inventors: Weibing Zhang, Beijing (CN); Lei Gao, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/936,220

(22) Filed: Nov. 4, 2024

(65) Prior Publication Data

US 2026/0104801 A1 Apr. 16, 2026

(30) Foreign Application Priority Data

Oct. 16, 2024 (CN) .......................... 202411447872.2

(51) Int. Cl.
*G06F 3/06* (2006.01)
(52) U.S. Cl.
CPC ............ *G06F 3/0616* (2013.01); *G06F 3/065* (2013.01); *G06F 3/0689* (2013.01)
(58) Field of Classification Search
None
See application file for complete search history.

(56) References Cited

U.S. PATENT DOCUMENTS 9,626,116 B1 * 4/2017 Martin ...................... G06F 11/14
11,656,780 B2 * 5/2023 Patil ......................... G06F 3/067
711/117

2012/0159097 A1 * 6/2012 Jennas .................. G06F 3/0619
711/E12.001
2012/0198152 A1 * 8/2012 Terry .................. G06F 11/1092
711/E12.001
2020/0327141 A1 * 10/2020 Thoppil .................. G06F 3/061
2023/0281049 A1 * 9/2023 Dong ...................... G06F 3/065
718/104

OTHER PUBLICATIONS

Dell Technologies, "Dell EMC Unity: Introduction to the Platform," Technical White Paper, Jun. 2021, 25 pages.
Dell Technologies, "Dell EMC Unity: FAST Technology Overview," Technical White Paper, Feb. 2021, 38 pages.
Dell Technologies, "Dell Unity: Replication Technologies," Technical White Paper, Apr. 2022, 87 pages.

* cited by examiner

*Primary Examiner* — Michael Alsip
(74) *Attorney, Agent, or Firm* — Ryan, Mason & Lewis, LLP

(57) ABSTRACT

An apparatus comprises at least one processing device configured to determine, for a given portion of data to be replicated from a first multiple-tier storage system to a second multiple-tier storage system, tiering information characterizing a given storage tier of the first storage system in which the given portion of data is stored. The at least one processing device is also configured to select, based at least in part on the determined tiering information and storage tier mapping policies mapping storage tiers between the first and second multiple-tier storage systems, one of the storage tiers in the second multiple-tier storage system. The at least one processing device is further configured to replicate the given portion of data from the given storage tier of the first multiple-tier storage system to the selected storage tier of the second multiple-tier storage system.

20 Claims, 15 Drawing Sheets

100

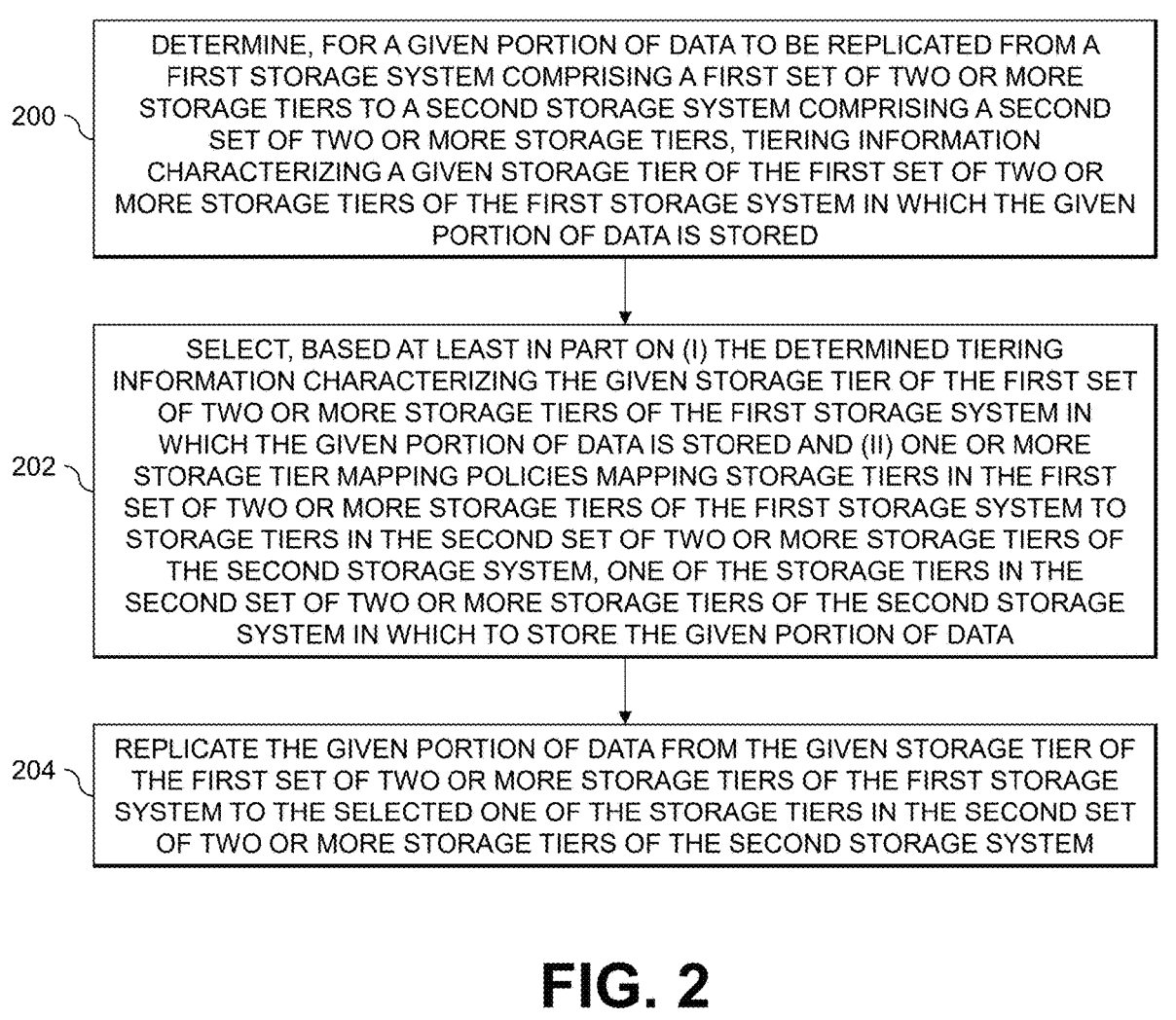

200 \ DETERMINE, FOR A GIVEN PORTION OF DATA TO BE REPLICATED FROM A FIRST STORAGE SYSTEM COMPRISING A FIRST SET OF TWO OR MORE STORAGE TIERS TO A SECOND STORAGE SYSTEM COMPRISING A SECOND SET OF TWO OR MORE STORAGE TIERS, TIERING INFORMATION CHARACTERIZING A GIVEN STORAGE TIER OF THE FIRST SET OF TWO OR MORE STORAGE TIERS OF THE FIRST STORAGE SYSTEM IN WHICH THE GIVEN PORTION OF DATA IS STORED

202 \ SELECT, BASED AT LEAST IN PART ON (I) THE DETERMINED TIERING INFORMATION CHARACTERIZING THE GIVEN STORAGE TIER OF THE FIRST SET OF TWO OR MORE STORAGE TIERS OF THE FIRST STORAGE SYSTEM IN WHICH THE GIVEN PORTION OF DATA IS STORED AND (II) ONE OR MORE STORAGE TIER MAPPING POLICIES MAPPING STORAGE TIERS IN THE FIRST SET OF TWO OR MORE STORAGE TIERS OF THE FIRST STORAGE SYSTEM TO STORAGE TIERS IN THE SECOND SET OF TWO OR MORE STORAGE TIERS OF THE SECOND STORAGE SYSTEM, ONE OF THE STORAGE TIERS IN THE SECOND SET OF TWO OR MORE STORAGE TIERS OF THE SECOND STORAGE SYSTEM IN WHICH TO STORE THE GIVEN PORTION OF DATA

204 \ REPLICATE THE GIVEN PORTION OF DATA FROM THE GIVEN STORAGE TIER OF THE FIRST SET OF TWO OR MORE STORAGE TIERS OF THE FIRST STORAGE SYSTEM TO THE SELECTED ONE OF THE STORAGE TIERS IN THE SECOND SET OF TWO OR MORE STORAGE TIERS OF THE SECOND STORAGE SYSTEM

FIG. 2

400
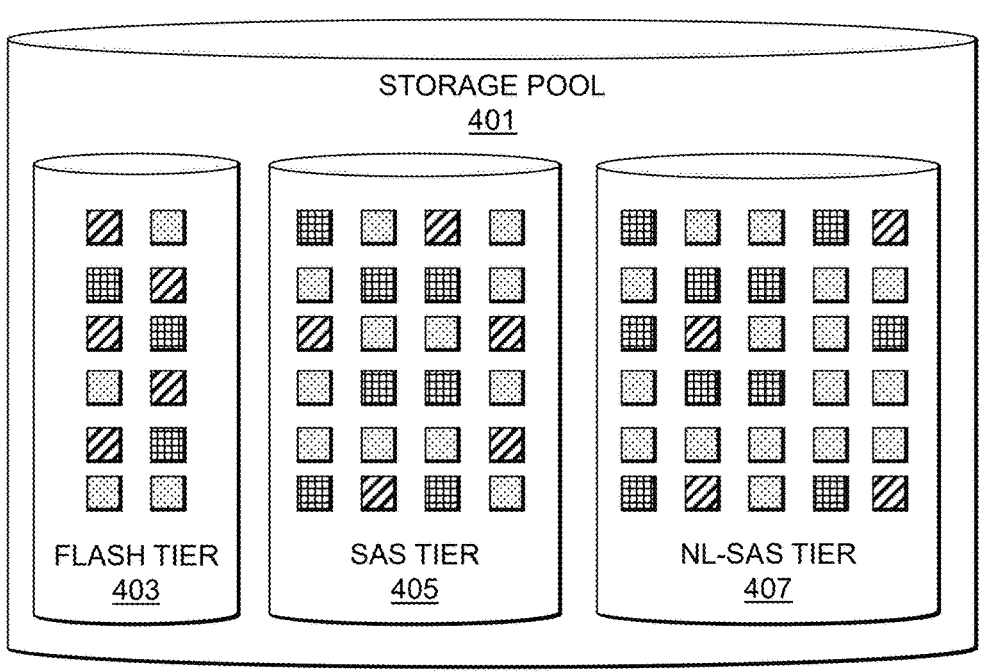
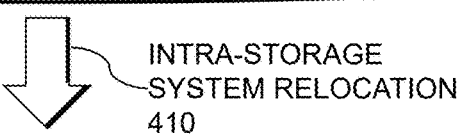
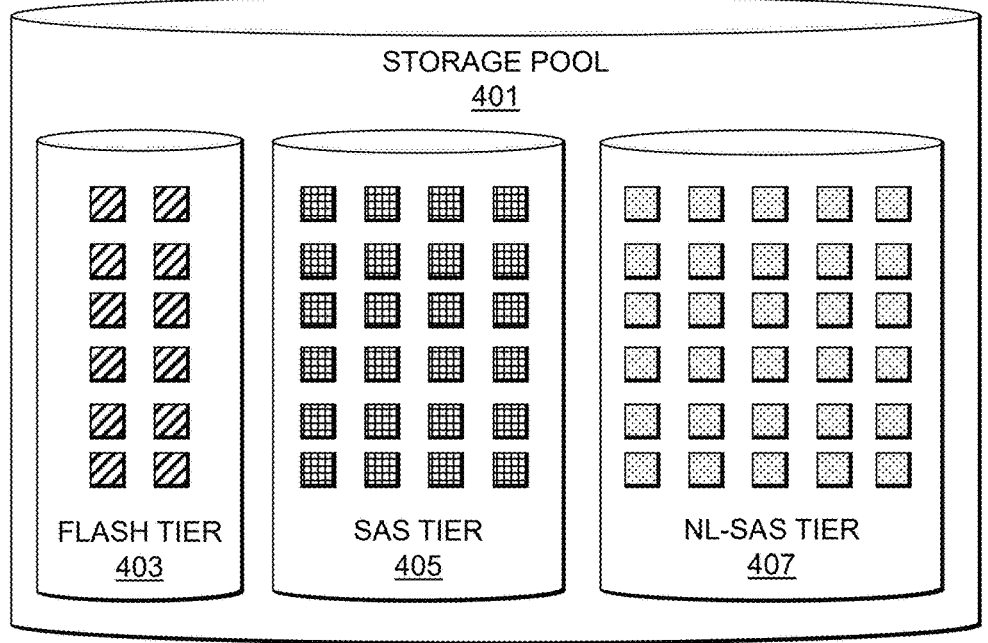
FIG. 4

500
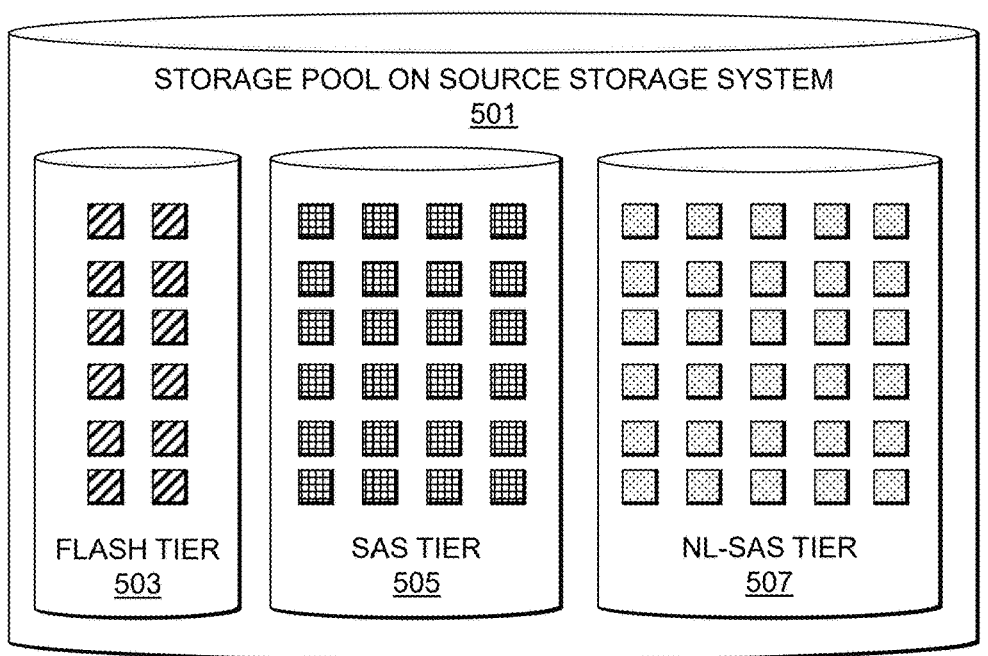
INTER-STORAGE SYSTEM
ASYNCHRONOUS REPLICATION
510
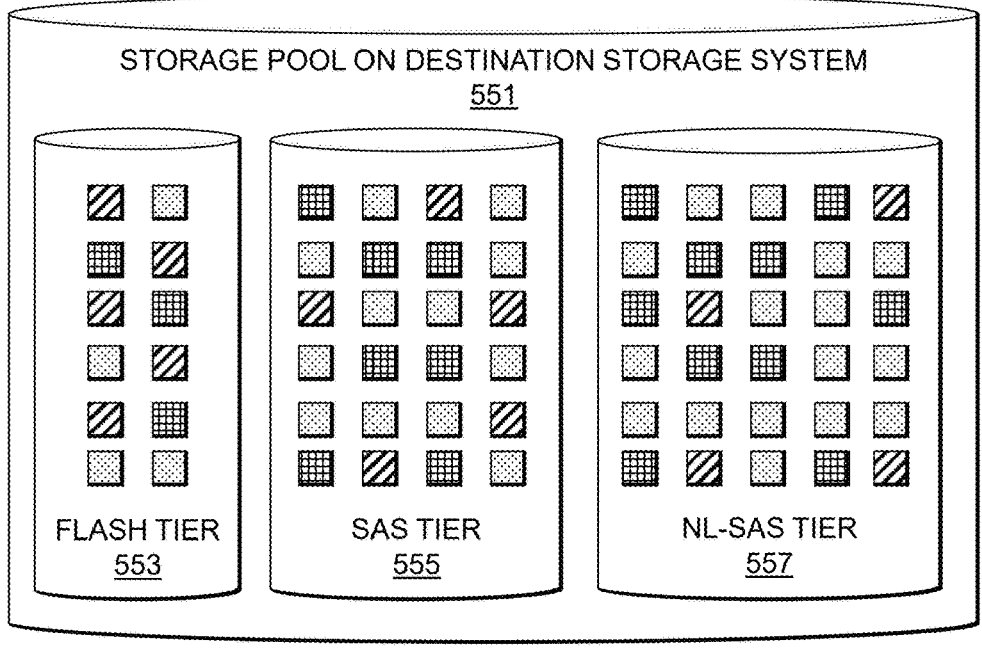
FIG. 5

1200
STORAGE POOL ON SOURCE STORAGE SYSTEM
1201
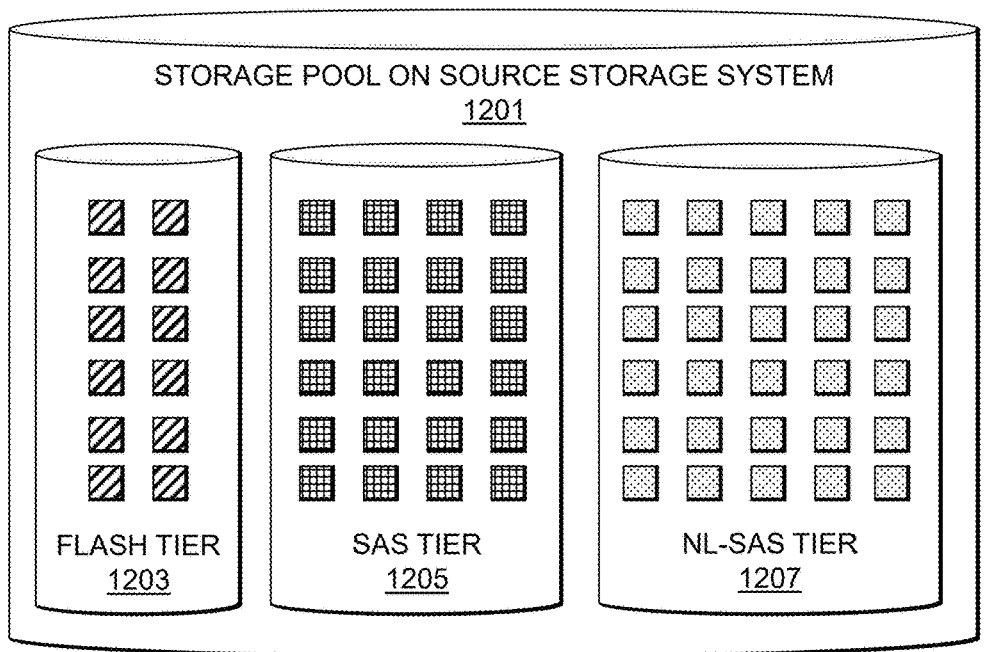
FLASH TIER
1203
SAS TIER
1205
NL-SAS TIER
1207
TIERING-AWARE INTER-STORAGE
SYSTEM ASYNCHRONOUS REPLICATION
1210
STORAGE POOL ON DESTINATION STORAGE SYSTEM
1251
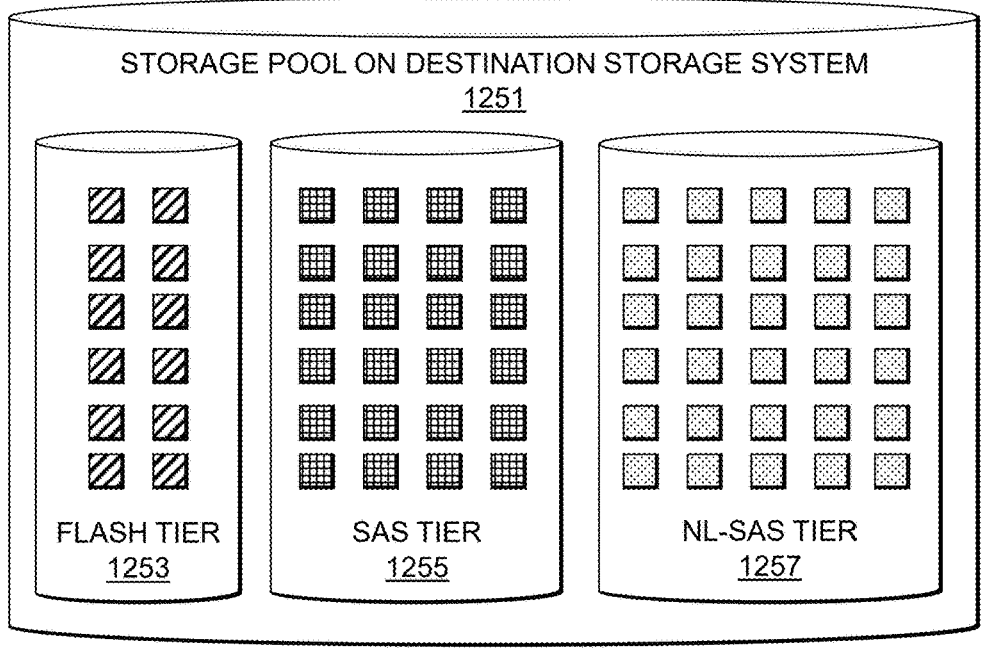
FLASH TIER
1253
SAS TIER
1255
NL-SAS TIER
1257
MOST
ACTIVITY
NEUTRAL
ACTIVITY
LEAST
ACTIVITY
FIG. 12

TIERING-AWARE REPLICATION FOR MULTIPLE-TIER STORAGE SYSTEMS

RELATED APPLICATION

The present application claims priority to Chinese Patent Application No. 202411447872.2, filed on Oct. 16, 2024 and entitled "Tiering-Aware Replication for Multiple-Tier Storage Systems," which is incorporated by reference herein in its entirety.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for tiering-aware replication for multiple-tier storage systems.

In one embodiment, an apparatus comprises at least one processing device comprising a processor coupled to a memory. The at least one processing device is configured to determine, for a given portion of data to be replicated from a first storage system comprising a first set of two or more storage tiers to a second storage system comprising a second set of two or more storage tiers, tiering information characterizing a given storage tier of the first set of two or more storage tiers of the first storage system in which the given portion of data is stored. The at least one processing device is also configured to select, based at least in part on (i) the determined tiering information characterizing the given storage tier of the first set of two or more storage tiers of the first storage system in which the given portion of data is stored and (ii) one or more storage tier mapping policies mapping storage tiers in the first set of two or more storage tiers of the first storage system to storage tiers in the second set of two or more storage tiers of the second storage system, one of the storage tiers in the second set of two or more storage tiers of the second storage system in which to store the given portion of data. The at least one processing device is further configured to replicate the given portion of data from the given storage tier of the first set of two or more storage tiers of the first storage system to the selected one of the storage tiers in the second set of two or more storage tiers of the second storage system.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for tiering-aware replication for multiple-tier storage systems in an illustrative embodiment.

FIG. 4 shows an example of intra-storage system relocation of data among multiple storage tiers in an illustrative embodiment.

FIG. 5 shows an example of inter-storage system asynchronous replication that is not tiering-aware in an illustrative embodiment.

FIG. 8 shows an example of tiering information transfer in a replication session between source and destination storage systems in an illustrative embodiment.

FIG. 12 shows an example of inter-storage system asynchronous replication that is tiering-aware in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
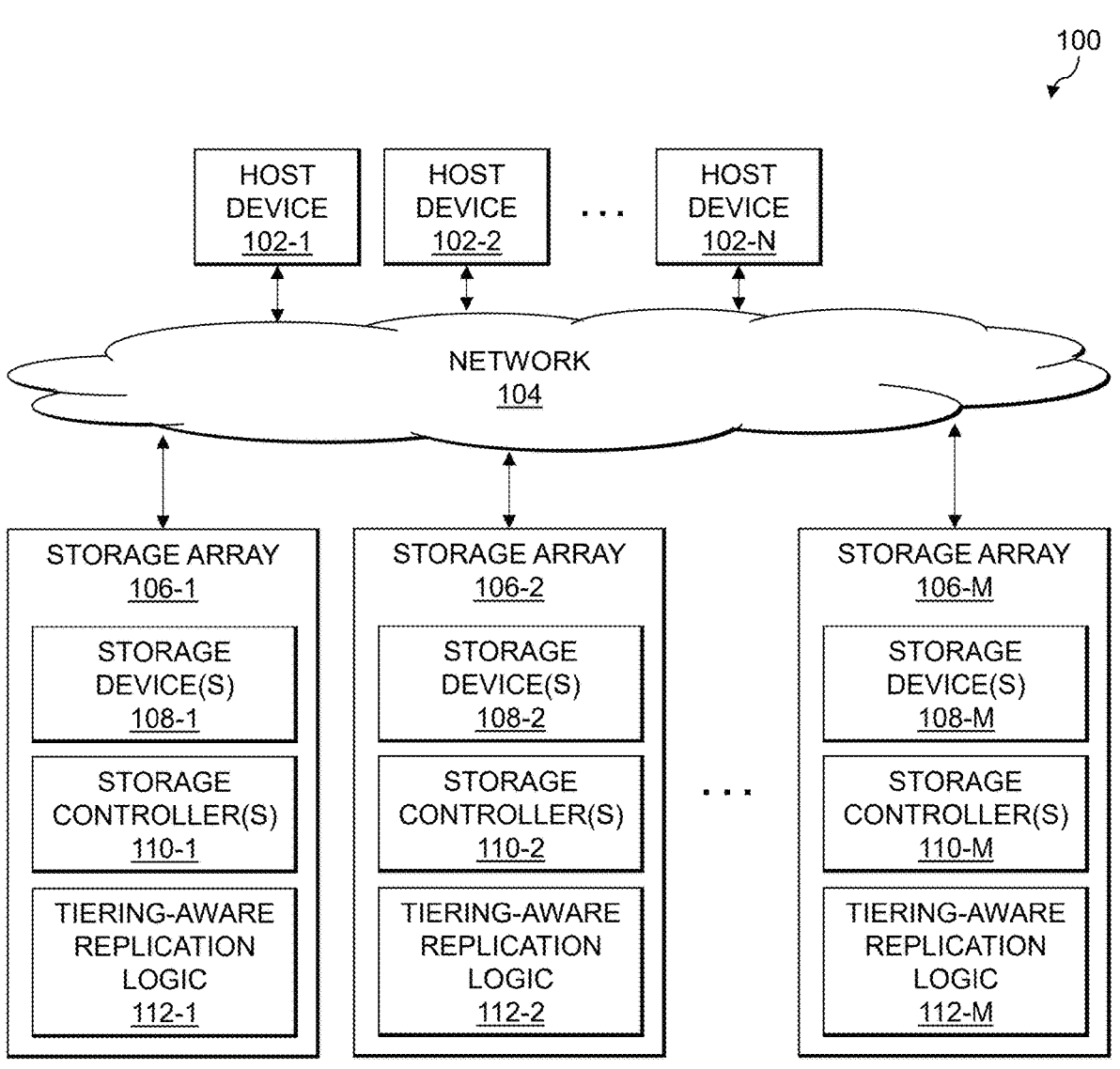
FIG. 1 is a block diagram of an information processing system configured for tiering-aware replication for multiple-tier storage systems in an illustrative embodiment.

FIG. 1 shows an information processing system 100 configured in accordance with an illustrative embodiment to provide functionality for tiering-aware replication for multiple-tier storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage arrays 106-1, 106-2, . . . 106-M, as shown in FIG. 1, comprise respective pluralities of storage devices 108-1, 108-2, . . . 108-M (collectively, storage devices 108)

and respective sets of one or more storage controllers 110-1, 110-2, . . . 110-M (collectively, storage controllers 110). The storage devices 108 each store data that is utilized by one or more applications running on the host devices 102. The storage devices 108 on each of the storage arrays 106 are illustratively arranged in one or more storage pools. The storage controllers 110 facilitate IO processing for the storage devices 108. The storage array 106-1 and its associated storage devices 108-1 are an example of what is more generally referred to herein as a "storage system." Similarly, the storage array 106-2 and its associated storage devices 108-2 and the storage array 106-M and its associated storage devices 108-M are examples of storage systems These storage systems in the present embodiment are shared by the host devices 102, and are therefore also referred to herein as "shared storage systems." In embodiments where there is only a single host device 102, the host device 102 may be configured to have exclusive use of the storage systems. In some embodiments, at least a subset of the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage arrays 106 may implement logical units (LUNs) configured to store objects for users associated with the host devices 102. These objects can comprise files, blocks or other types of objects. The host devices 102 interact with the storage arrays 106 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage arrays 106 to include different portions of one or more physical storage devices. Storage devices 108 may therefore be viewed as comprising respective LUNs or other logical storage volumes.

The storage devices 108 of the storage arrays 106 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The storage controllers 110 of the storage arrays 106 are assumed to implement functionality for tiering-aware replication (e.g., between different ones of the storage arrays 106 having multiple storage tiers, from one or more of the storage arrays 106 to other storage arrays or storage systems not explicitly shown in FIG. 1 which have multiple storage tiers, etc.). Such functionality is provided via tiering-aware replication logic 112-1, 112-2, . . . 112-M (collectively, tiering-aware replication logic 112) on the storage arrays 106-1, 106-2, . . . 106-M. The tiering-aware replication logic 112 is configured, at a source one of the storage arrays 106 in a replication process, to determine tiering information for data that is to be replicated to a destination one of the storage arrays 106. The tiering-aware replication logic 112 is configured to include the determined tiering information when transferring the data that is to be replicated from the source to the destination one of the storage arrays 106. The tiering-aware replication logic 112 is configured, at the destination one of the storage arrays 106, to parse the tiering information that is included in the transferred data, and to utilize the tiering information to select which storage tier the replicated data should be written to at the destination one of the storage arrays 106. The tiering-aware replication logic 112 may also be configured to determine tier mapping and redirection policies, which are utilized to map between source storage tiers at the source one of the storage arrays 106 and destination storage tiers at the destination one of the storage arrays 106, and how to handle redirection of writes in the event that a target destination storage tier becomes full.

Although in the FIG. 1 embodiment the different instances of tiering-aware replication logic 112 are shown as being implemented internal to the storage arrays 106 and outside the storage controllers 110, in other embodiments one or more of the instances of the tiering-aware replication logic 112 may be implemented at least partially internal to the storage controllers 110 or at least partially outside the storage arrays 106, such as on one of the host devices 102, on one or more servers external to the host devices 102 and the storage arrays 106 (e.g., including on a cloud computing platform or other type of information technology (IT) infrastructure), etc.

At least portions of the functionality of the tiering-aware replication logic 112 may be implemented at least in part in the form of software that is stored in memory and executed by a processor.

The host devices 102 and the storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and/or one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 106 in the present embodiment are assumed to comprise a persistent memory that is implemented using a flash memory or other type of non-volatile memory of the storage arrays 106. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage arrays 106, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 13 and 14.

It is to be understood that the particular set of elements shown in FIG. 1 for tiering-aware replication for multiple-tier storage systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for tiering-aware replication for multiple-tier storage systems will now be described in more detail with reference to the flow diagram of FIG. 2. It is to be understood that this particular process is only an example, and that additional or alternative processes for tiering-aware replication for multiple-tier storage systems may be used in other embodiments.

In this embodiment, the process includes steps 200 through 204. These steps are assumed to be performed by one or more of the storage arrays 106 utilizing their respective instances of the tiering-aware replication logic 112. The process begins with step 200, determining, for a given portion of data to be replicated from a first storage system comprising a first set of two or more storage tiers to a second storage system comprising a second set of two or more storage tiers, tiering information characterizing a given storage tier of the first set of two or more storage tiers of the first storage system in which the given portion of data is stored. In step 202, one of the storage tiers in the second set of two or more storage tiers of the second storage system in which to store the given portion of data is selected based at least in part on (i) the determined tiering information characterizing the given storage tier of the first set of two or more storage tiers of the first storage system in which the given portion of data is stored and (ii) one or more storage tier mapping policies mapping storage tiers in the first set of two or more storage tiers of the first storage system to storage tiers in the second set of two or more storage tiers of the second storage system. In step 204, the given portion of data is replicated from the given storage tier of the first set of two or more storage tiers of the first storage system to the selected one of the storage tiers in the second set of two or more storage tiers of the second storage system.

The first set of two or more storage tiers of the first storage system may be different than the second set of two or more storage tiers of the second storage system. A first number of storage tiers in the first set of two or more storage tiers of the first storage system may be less than a second number of storage tiers in the second set of two or more storage tiers of the second storage system, or a first number of storage tiers in the first set of two or more storage tiers of the first storage system may be greater than a second number of storage tiers in the second set of two or more storage tiers of the second storage system.

In some embodiments, the one or more storage tier mapping policies map a first storage tier of the first set of two or more storage tiers of the first storage system providing a first performance level to a second storage tier of the second set of two or more storage tiers of the second storage system providing a second performance level, the second performance level being different than the first performance level. The one or more storage tier mapping policies may map a first storage tier of the first set of two or more storage tiers of the first storage system utilizing a first type of storage device to a second storage tier of the second set of two or more storage tiers of the second storage system utilizing a second type of storage device, the second type of storage device being different than the first type of storage device.

In some embodiments, the one or more storage tier mapping policies map a first storage tier and a second storage tier of the first set of two or more storage tiers of the first storage system to a same storage tier of the second set of two or more storage tiers of the second storage system providing a second performance level.

The one or more storage tier mapping policies may specify a prioritized ordering for mapping the given storage tier of the first set of two or more storage tiers of the first storage system to two or more different ones of the storage tiers of the second set of two or more storage tiers of the second storage system. Selecting the one of the storage tiers in the second set of two or more storage tiers of the second storage system in which to store the given portion of data may comprise determining whether a first one of the two or more different ones of the storage tiers of the second set of two or more storage tiers of the second storage system in the prioritized ordering has available storage capacity for storing the given portion of data. Responsive to determining that the first one of the two or more different ones of the storage tiers of the second set of two or more storage tiers of the second storage system in the prioritized ordering has available storage capacity for storing the given portion of data, the first one of the two or more different ones of the storage tiers of the second set of two or more storage tiers of the second storage system is selected in step 202. Responsive to determining that the first one of the two or more different ones of the storage tiers of the second set of two or more storage tiers of the second storage system in the prioritized ordering does not have available storage capacity for storing the given portion of data, a second one of the two or more different ones of the storage tiers of the second set of two or more storage tiers of the second storage system is selected in step 202.

The determined tiering information characterizing the given storage tier of the first set of two or more storage tiers of the first storage system in which the given portion of data is stored may be transferred with the given portion of data from the first storage system to the second storage system, and step 202 may be performed by the second storage system utilizing the determined tiering information characterizing the given storage tier of the first set of two or more storage tiers of the first storage system in which the given portion of data is stored that is transferred with the given portion of data from the first storage system to the second storage system.

The given portion of data may be replicated from the first storage system to the second storage system as part of an asynchronous replication process. The given portion of data may also be replicated from the first storage system comprising the first set of one or more storage tiers to a third storage system comprising a third set of two or more storage tiers, where the given portion of data is replicated from the given storage tiers of the first set of two or more storage tiers of the first storage system to a selected one of the storage tiers in the third set of two or more storage tiers of the third storage system. The selected one of the storage tiers in the third set of two or more storage tiers of the third storage system may provide a different performance level than the selected one of the storage tiers in the second set of two or more storage tiers of the second storage system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions for optimizing or improving replication processes, including asynchronous replication processes, to keep data placement distributions in multiple-tier storage systems (e.g., storage systems having two or more storage tiers, also referred to as multi-tier storage systems). The technical solutions allow end-users to select to perform tiering-aware replication, where data is replicated from a source storage system to a destination storage system while retaining the data distribution among multiple storage tiers. The data distribution among the multiple storage tiers may, for example, be based on data activity (e.g., IO "temperature" of different data blocks). The data placement on the destination storage system, during asynchronous replication, will be determined utilizing tiering information fetched from the source storage system. The technical solutions are able to keep user file activity temperature consistent across the source and destination storage systems, to ensure user data service quality while also reducing wearing level for SSD devices. The technical solutions may be applied to any storage systems that use a multiple storage tier (multi-tier) configuration, and which perform replication (e.g., asynchronous replication) across different storage instances. For storage systems that apply advanced replication approaches (e.g., with a fan-out or cascade topology), all replication destinations can benefit from application of the technical solutions described herein.

Data replication helps to provide data redundancy, and safeguards against storage system failures (e.g., at a main or production site). Having a remote site (also referred to as a disaster recovery site) can protect against system and site-wide outages at the production site, and provides a remote location to resume production and minimize downtime due to a disaster or other downtime at the production site. Various storage systems, including Dell Unity storage systems, provide replication support including support for Advanced Replication to protect user data. The replication process for multiple-tier storage systems in conventional approaches, however, is not aware of data tiering across multiple storage tiers at the source site, and thus does not keep data distribution information among different storage tiers while writing replicated data at the destination site. This makes the data replication drop or ignore the data block activity temperature learned at the source site. In some instances, asynchronous replication is used to migrate data from an old platform to a new platform. When there is a need to move a user application to a destination site, the lack of awareness of data tiering at the source site can impact data service quality at the destination site. Further, data misplacement and relocation after the replication will impact the wear level of storage devices (e.g., SSD devices) at the destination site.

Figure 3:
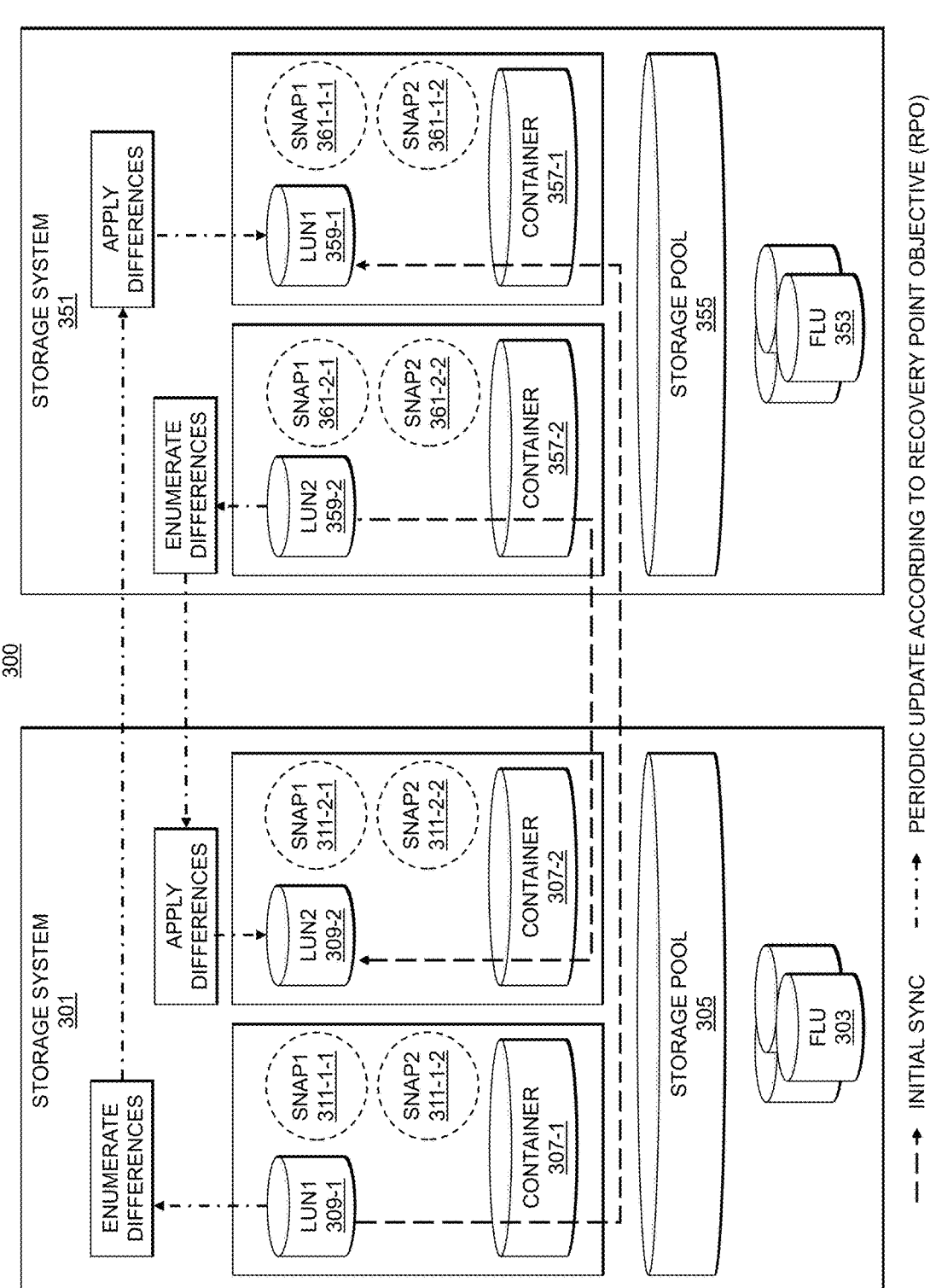
FIG. 3 shows asynchronous replication between source and destination storage systems in an illustrative embodiment.

FIG. 3 shows a system 300 configured for performing replication between storage systems 301 and 351. The storage systems 301 and 351 implement respective sets of one or more Flare Logical Units (FLUs) 303 and 353 along with storage pools 305 and 355. The FLUs 303 and 353 are examples of Redundant Array of Independent Disks (RAID) group LUNs. The storage systems 301 and 351 further implement sets of container instances. The storage system 301 comprises containers 307-1 and 307-2 (collectively, containers 307) comprising LUNs 309-1 and 309-2 (collectively, LUNs 309). The LUN 309-1 has snapshots 311-1-1 and 311-1-2 (collectively, snapshots 311-1), and the LUN 309-2 has snapshots 311-2-1 and 311-2-2 (collectively, snapshots 311-2). Similarly, the storage system 351 comprises containers 357-1 and 357-2 (collectively, containers 357), LUNs 359-1 and 359-2 (collectively, LUNs 359), where the LUN 359-1 has snapshots 361-1-1 and 361-1-2 (collectively, snapshots 361-1) and the LUN 359-2 has snapshots 361-2-1 and 361-2-2 (collectively, snapshots 361-2). The containers 307 and 357 may utilize a Common Block File System (CBFS), which is a block layer file system designed to manage block mapping. In the system 300, data from LUN 309-1 on the storage system 301 is replicated to the LUN 359-1 on the storage system 351, and data from the LUN 359-2 on the storage system 351 is replicated to the LUN 309-2 on the storage system 301. Thus, it should be appreciated that a single storage system may be a "source" storage system for a first replication process and may be a "destination" storage system for a second replication process. The replication processes shown in FIG. 3 include initial synchronization, followed by periodic updates according to recovery point objectives (RPOs).

Replication is a software feature which synchronizes data from a source to a destination (e.g., within the same site as the source, or at a different remote location, such as a disaster recovery (DR) site). Replicating data helps to provide data redundancy, and safeguards against storage system failures at the main production site. Having a remote site can protect against system and site-wide outages, and provide a remote location to resume production and minimize downtime to a disaster. Storage systems such as Dell Unity storage systems support various types of replication, including synchronous and asynchronous replication. Asynchronous replication leverages space-efficient snapshots to replicate point-in-time consistent copies of one or more storage volumes. Asynchronous replication does not require the destination to be a mirror of the source simultaneously on each IO request—it only needs the destination to be synchronized with the source periodically according to a designated RPO. When the asynchronous replication becomes "in sync", the source and destination have a common base snapshot pair. According to the RPO, the source takes a snapshot at a point in time, and transfers the delta (e.g., changed data from the last point-in-time snapshot replicated from the source to the destination) between the common base snapshot. The destination uses a shadow snapshot to receive IO requests from the source and refresh the common base snapshot when the data transfer completes.

Storage systems such as Dell Unity storage systems leverage snapshots to achieve asynchronous replication. When an asynchronous replication session is created, an initial sync will be triggered to copy a source storage object to the destination. After the initial sync finishes, snapshot-based periodic updates will be executed, such as by calling a function (an EnumerateDifferences( ) function call) that enumerates differences between the data at a point-in-time and the last snapshot (e.g., differences of the metadata between the common base snapshot and the latest snapshot). Then, the asynchronous replication engine will read the actual data blocks from the source and send them to the destination based on the results (e.g., of the EnumerateDifferences( ) function call). The common base snapshot is then updated to the latest snapshot.

Fully Automated Storage Tiering for Virtual Pools (FAST-VP) functionality monitors data access patterns within storage pools on a storage system, and dynamically matches the performance requirements of the data with storage drives or devices (e.g., of a particular one of multiple storage tiers) that provide a corresponding level of performance. In some cases, FAST-VP classifies storage drives or devices into three categories or storage tiers: an Extreme Performance Tier comprised of flash drives; a Performance Tier comprise of Serial Attached SCSI (SAS) drives; and a Capacity Tier comprised of Near-Line SAS (NL-SAS) drives. FAST-VP tiering policies are used to make tiering choices for data within each of the storage pools. This setting is referred to as a tiering policy. FAST-VP uses these tiering policies to meet performance goals based on the storage resources that are available. The tiering policies may include: highest available tier; auto-tiering; starting high then auto-tiering (e.g., a default/recommended tiering policy); and lowest available tier.

FAST-VP bases relocation decisions on an algorithm which considers the activity level of each slice, and the resource's tiering policy. The algorithm then orders the slices based on a rank, which will later be used during the relocation window. This process is repeated periodically (e.g., hourly), and a data movement candidate list is created for all storage pools within the system. Relocations across the different storage tiers occur on blocks of data of a designated size (e.g., 256 megabytes (MB)), called slices. CBFS provides the raw function to replace the contents of one slice with another one without interrupting IO. CBFS uses a Data Manipulation Language (DML) to move data from the original data region to the new one.

FAST-VP uses the storage pool configuration information and IO statistics to calculate and assign temperatures to storage regions allocated from each storage pool (e.g., at the slice granularity, such as 256 MB). Data regions that are accessed more frequently are assigned a higher temperature than data regions that are not accessed as frequently (which may be assigned a colder temperature). FAST-VP uses the configuration information and the temperatures to build a prioritized list of data regions that should be moved to higher or lower tiered storage. This allows FAST-VP to try to keep the most frequently accessed data regions on the fastest storage for better response times.

FIG. 4 shows a system 400 implementing intra-storage system relocation 410 of data among multiple storage tiers. In the system 400, a storage pool 401 comprises a flash tier 403 (e.g., an Extreme Performance Tier), a SAS tier 405 (e.g., a Performance Tier) and a NL-SAS tier 407 (e.g., a Capacity Tier). Prior to application of intra-storage system relocation 410 (e.g., using FAST-VP functionality), the data stored on the different storage tiers 403, 405 and 407 is not balanced according to the activity levels of the data. Following application of the intra-storage system relocation 410, the data stored on the different storage tiers 403, 405 and 407 is balanced according to the activity levels of the data, with the most active data stored on the flash tier 403, data with neutral activity stored on the SAS tier 405, and with the least active data stored on the NL-SAS tier 407.

As discussed above, asynchronous data replication helps to keep data consistent between the replication source and destination, and helps to provide data redundancy and safeguards against storage system or other failures or disruptions at the source site (e.g., a main production site). However, when data replication is performed between multiple-tier storage systems, data tiering information in conventional approaches is dismissed, ignored or otherwise not taken into account. This is illustrated in FIG. 5, which shows a system 500 in which inter-storage system asynchronous replication 510 is performed between a storage pool 501 on a source storage system and a storage pool 551 on a destination storage system. The storage pool 501 on the source storage system comprises a flash tier 503 (e.g., an Extreme Performance Tier), a SAS tier 505 (e.g., a Performance Tier) and a NL-SAS tier 507 (e.g., a Capacity Tier). Similarly, the storage pool 551 on the destination storage system comprises a flash tier 553 (e.g., an Extreme Performance Tier), a SAS tier 555 (e.g., a Performance Tier) and a NL-SAS tier 557 (e.g., a Capacity Tier). As shown in FIG. 5, the storage pool 501 on the source storage system is balanced, in that intra-storage system data relocation (e.g., FAST-VP functionality) has been performed such that the data stored on the different storage tiers 503, 505 and 507 is balanced according to the activity levels of the data, with the most active data stored on the flash tier 503, data with neutral activity stored on the SAS tier 505, and with the least active data stored on the NL-SAS tier 507. Since the inter-storage system asynchronous replication 510 is not "tiering-aware", the tiering information for the storage pool 501 on the source storage system is dismissed, ignored or otherwise not taken into account resulting in data not being balanced among the different storage tiers 553, 555 and 557 when the data is replicated to the storage pool 551 on the destination storage system as illustrated. Thus, intra-storage system data relocation (e.g., FAST-VP functionality) will need to be performed again at the destination storage system to optimally store the data among the different storage tiers 553, 555 and 557 of the storage pool 551 of the destination storage system. This breaks the data distribution based on data activity temperature, and may lead to degradation in IO performance with the same user workload. The IO performance will be impacted as "hot" data stored in the fastest storage tier of the source storage system (e.g., the flash tier 503) may be transferred to slower storage tiers (e.g., the SAS tier 555 or NL-SAS tier 557) of the destination storage system. Thus, after replication, data will need to be relocated again among the different storage tiers 553, 555 and 557 at the destination storage system, which leads to unnecessary IO and increases wear leveling (e.g., of SSD disks).

The technical solutions described herein provide functionality for performing tiering-aware replication among multiple-tier storage systems. The technical solutions provide a method to query and pass the data block tiering information and activity temperature during asynchronous replication sessions. The concept of per-block-temperature is introduced to represent block level data activity temperature. Data block placement among different storage tiers at a destination site will be determined by corresponding tiering information from the source site. Meanwhile, slice activity temperature will be rebuilt based on data block activity tiering information from the asynchronous replication source. At the source side, the replication read request will keep a record of the data block tiering information. The data block and its associated tiering information will be packed into the IO buffer list with a bitmap. As the buffer list is transferred to the replication destination, the block will be written to the corresponding storage tier (e.g., in accordance with tier mapping rules discussed in further detail below). With the tiering-aware replication functionality, data activity temperature will be kept during asynchronous replication. A user could thus expect the same performance with continuous user data IO requests when there is a need to move a user application to the replication destination.

Figure 6:
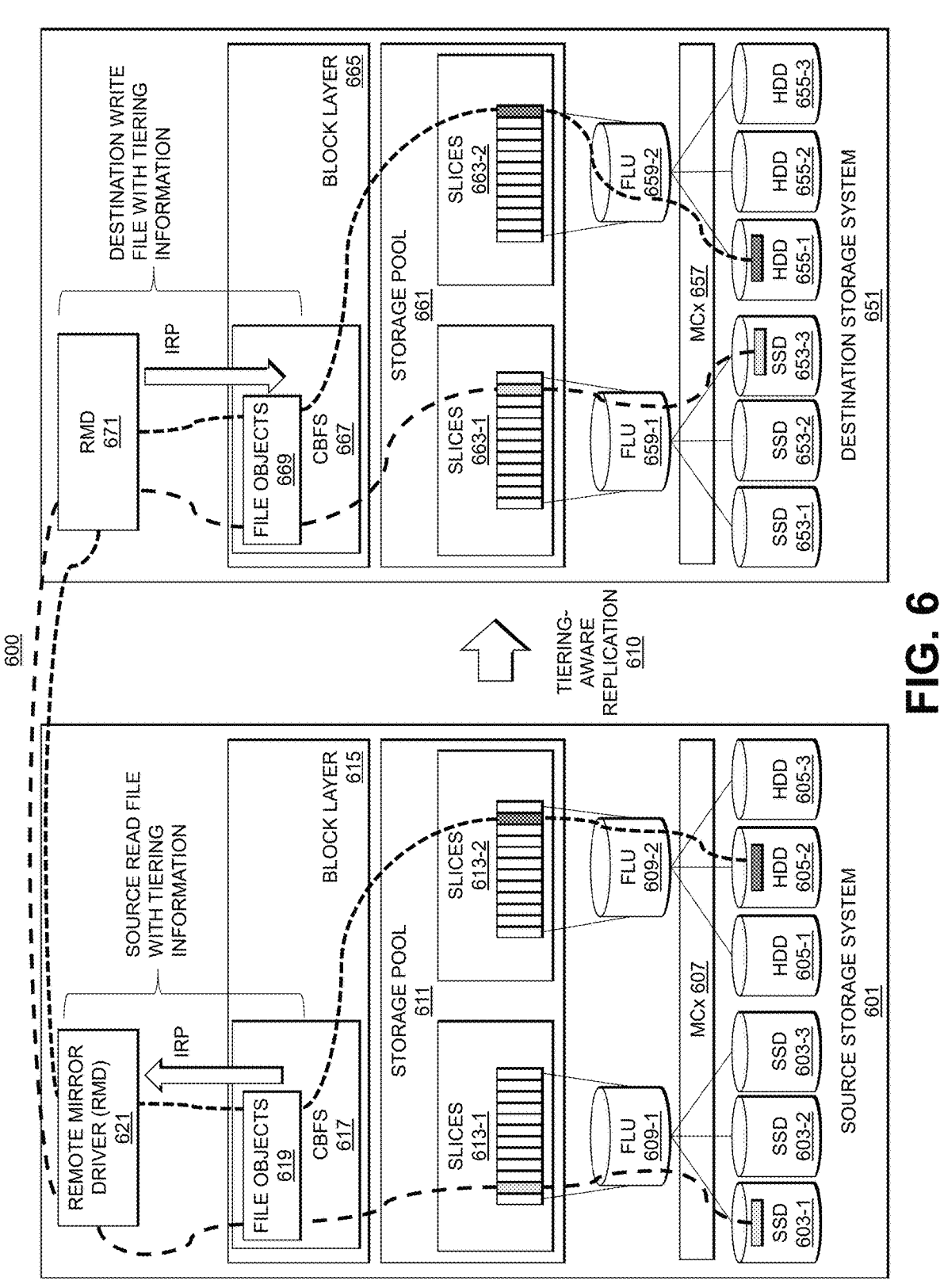
FIG. 6 shows an example of tiering-aware replication between source and destination storage systems having multiple storage tiers in an illustrative embodiment.

FIG. 6 shows a system 600 configured for tiering-aware replication 610 between a source storage system 601 and a destination storage system 651. The source storage system 601 comprises storage devices including a set of SSDs 603-1, 603-2 and 603-3 (collectively, SSDs 603) and a set of HDDs 605-1, 605-2 and 605-3 (collectively, HDDs 605). The source storage system 601 implements Multi-Core Services (MCx) 607, where x may represent cache/flush/ RAID so that multiple processing cores of the source storage system 601 are able to perform data mapping and IO. The SSDs 603 are associated with FLU 609-1, and the HDDs 605 are associated with FLU 609-2. The source storage system 601 comprises a storage pool 611, with slices 613-1 of the FLU 609-1 and slices 613-2 of the FLU 609-2. A block layer 615 of the source storage system 601 implements CBFS 617, which has file objects 619 that are replicated to the destination storage system 651 using remote mirror driver (RMD) 621 using an IO request packet (IRP) protocol. The RMD 621 performs a source read of the file objects 619 with tiering information, with network transfer of the file objects 619 from the source storage system 601 to the destination storage system 651 which includes extra data tiering information. The file objects 619 may be upper deck file system (UDFS) file objects, where "upper deck" refers to a file layer and "lower deck" refers to the block layer 615. The upper deck is for a user file system to map user files to data blocks, and the lower deck is for the system to manage data blocks on underlying storage media.

The destination storage system 651 similarly includes a set of SSDs 653-1, 653-2 and 653-3 (collectively, SSDs 653) and a set of HDDs 655-1, 655-2 and 655-3 (collectively, HDDs 655), along with MCx 657 for performing data mapping and IO. The SSDs 653 are associated with FLU 659-1, and the HDDs 655 are associated with FLU 659-2. The destination storage system 651 includes a storage pool 661, with slices 663-1 of the FLU 659-1 and slices 663-2 of the FLU 659-2. A block layer 665 of the destination storage system 651 implements CBFS 667, which has file objects 669 that are replaced from the source storage system 601 using RMD 671 using the IRP protocol. The RMD 671 performs a destination write of the file objects 669 with tiering information, which was transferred from the RMD 621 along with the data blocks to be written.

Figure 7A:
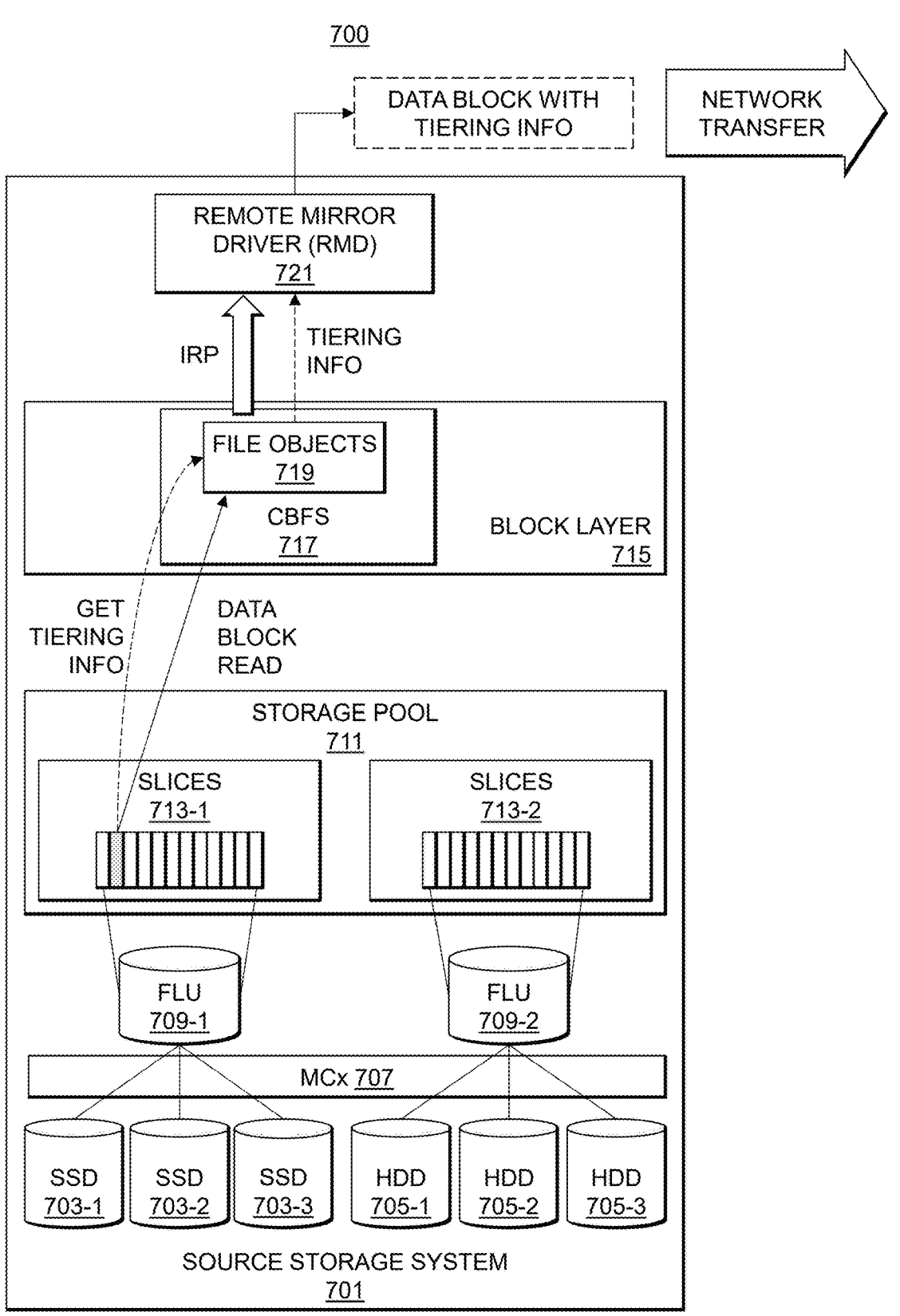
FIGS. 7A and 7B show examples of a tiering-aware replication source read and a tiering-aware replication destination read for storage systems having multiple storage tiers in an illustrative embodiment.
Figure 7B:
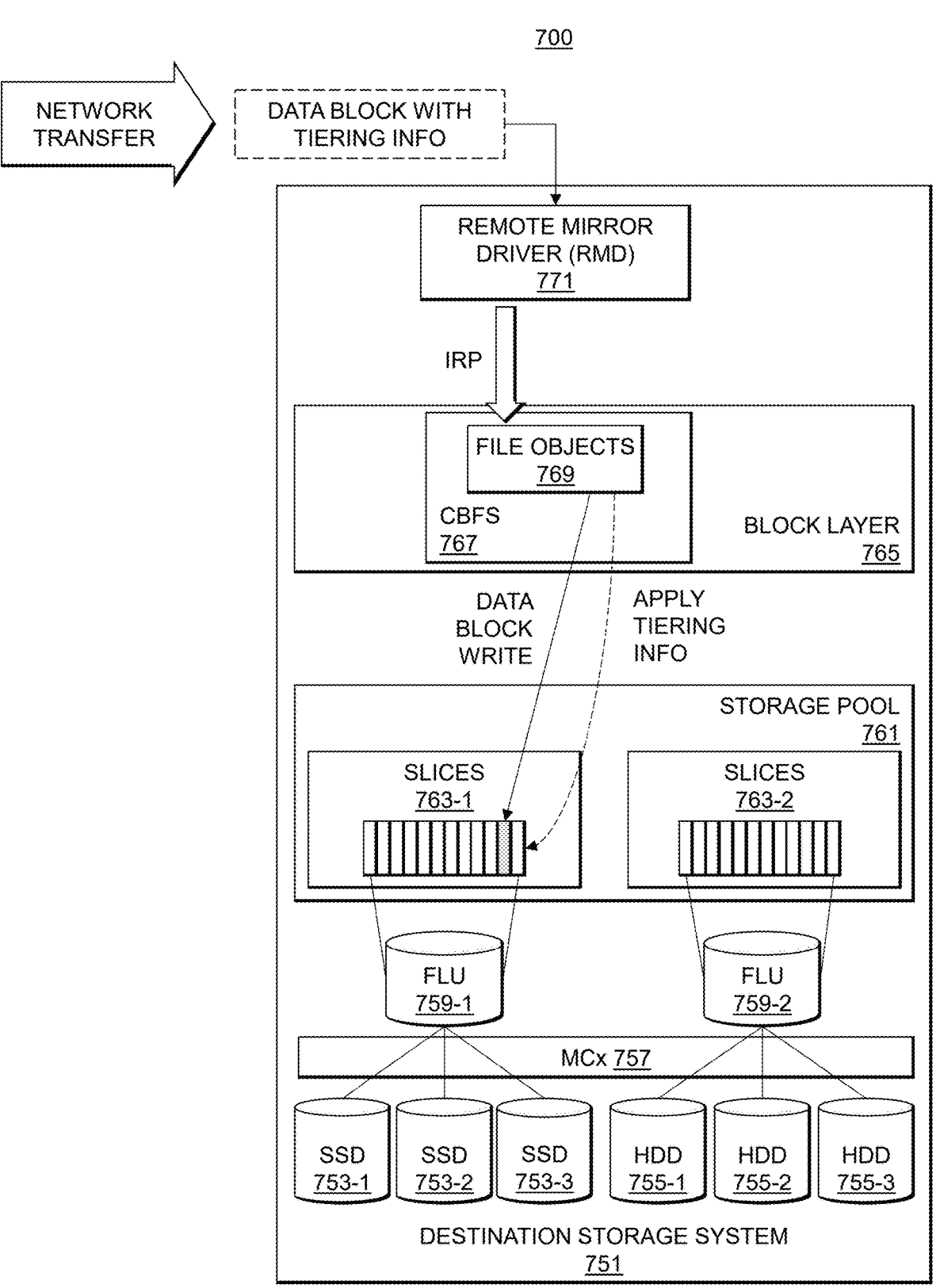

FIGS. 7A and 7B show a system 700 illustrating details of tiering-aware replication between a source storage system 701 and a destination storage system 751. The source storage system 701 and the destination storage system 751 are configured in a manner similar to that of the source storage system 601 and the destination storage system 651. The source storage system 701 comprises SSDs 703-1, 703-2 and 703-3 (collectively, SSDs 703), HDDs 705-1, 705-2 and 705-3 (collectively, HDDs 705), MCx 707, FLUs 709-1 and 709-2 (collectively, FLUs 709), storage pool 711 with slices 713-1 and 713-2, block layer 715 implementing CBFS 717 for file objects 719, and RMD 721. The destination storage system 751 comprises SSDs 753-1, 753-2 and 753-3 (collectively, SSDs 753), HDDs 755-1, 755-2 and 755-3 (collectively, HDDs 755), MCx 757, FLUs 759-1 and 759-2 (collectively, FLUs 759), storage pool 761 with slices 763-1 and 763-2, block layer 765 implementing CBFS 767 for file objects 769, and RMD 771.

In the system 700, it is assumed that the IRP protocol is used to transfer IO requests between the source storage system 701 and the destination storage system 751. During an asynchronous replication session, the replication source read request (e.g., at the source storage system 701 as shown in FIG. 7A) will add a "tiering" field to carry tiering information. As the IRPs get processed by the CBFS 717 mapping application programming interface (API), the actual data tiering information will be recorded in an IRP reply together with the requested data blocks. The replication IRP thus transfers the tiering information to the destination storage system 751. As the replication session writes the blocks, the tiering information will be provided to the block layer 765 (as shown in FIG. 7B). When LDFS handles the IO, it will respect or take into account the tiering information and any applicable tier mapping rules to write the data blocks to the corresponding tier accordingly.

Figure 8:
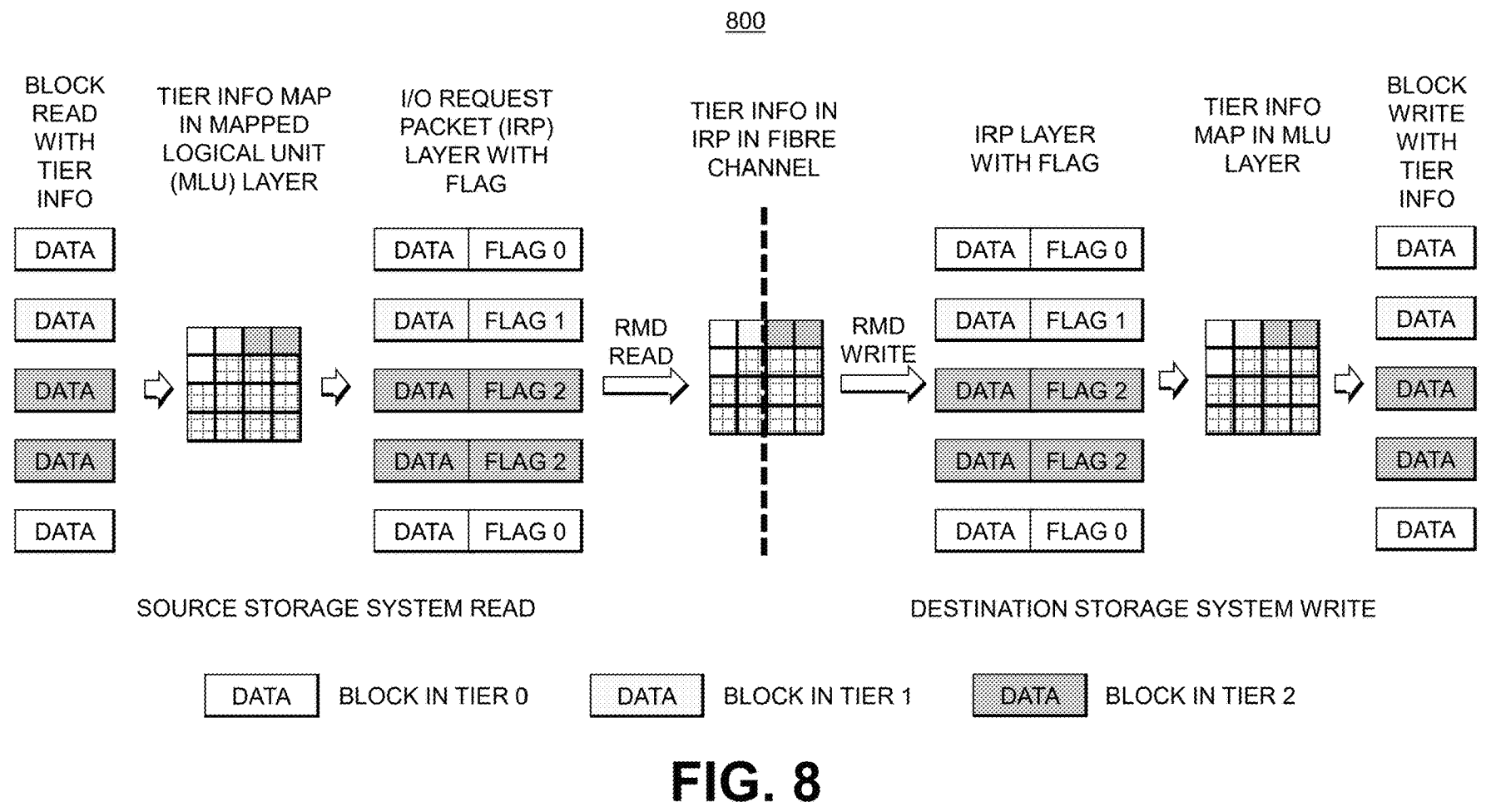

FIG. 8 shows a system flow 800 for the transfer of tiering information together with data blocks in a replication session between source and destination storage systems. For the data blocks that are being transferred in a replication session, as the replication read request arrives in the block layer (e.g., block layer 715 of the source storage system 701 in the system 700), a tiering flag will be updated in memory to indicate the tiering location information of the different data blocks. The data blocks and their associated tiering information are packed in a Mapped Logical Unit (MLU) layer, and IRPs will carry the blocks and tiering information to the RMD layer (e.g., RMD 721 of the source storage system 701 in the system 700). The IRPs are transferred over a network, where the IRPs include the data blocks together with their associated tiering information (e.g., in the form of tiering flags in the example of FIG. 8). At the destination storage system, the reverse process is applied from the IRP layer to the MLU layer to extract the data blocks and apply the write according to the tiering information included in the IRPs.

Figure 9:
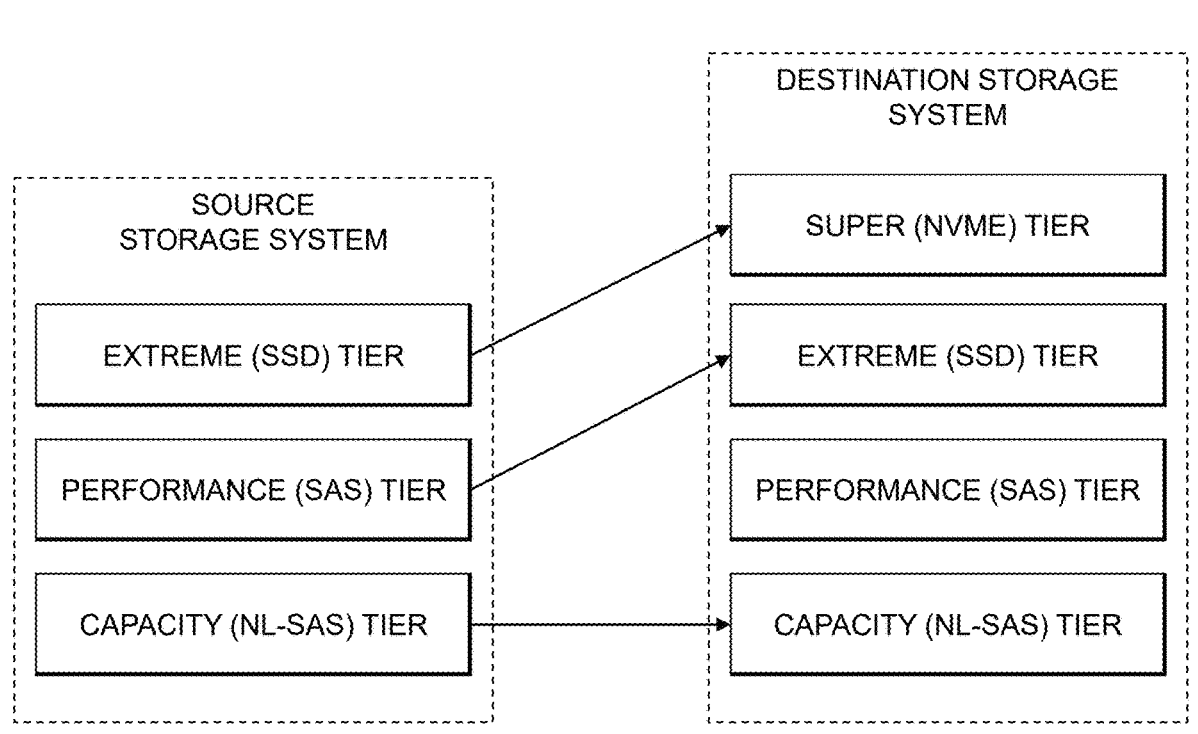
FIG. 9 shows an example of tier mapping rules for tiering-aware replication between source and destination storage systems having different storage tiers in an illustrative embodiment.
Figure 10:
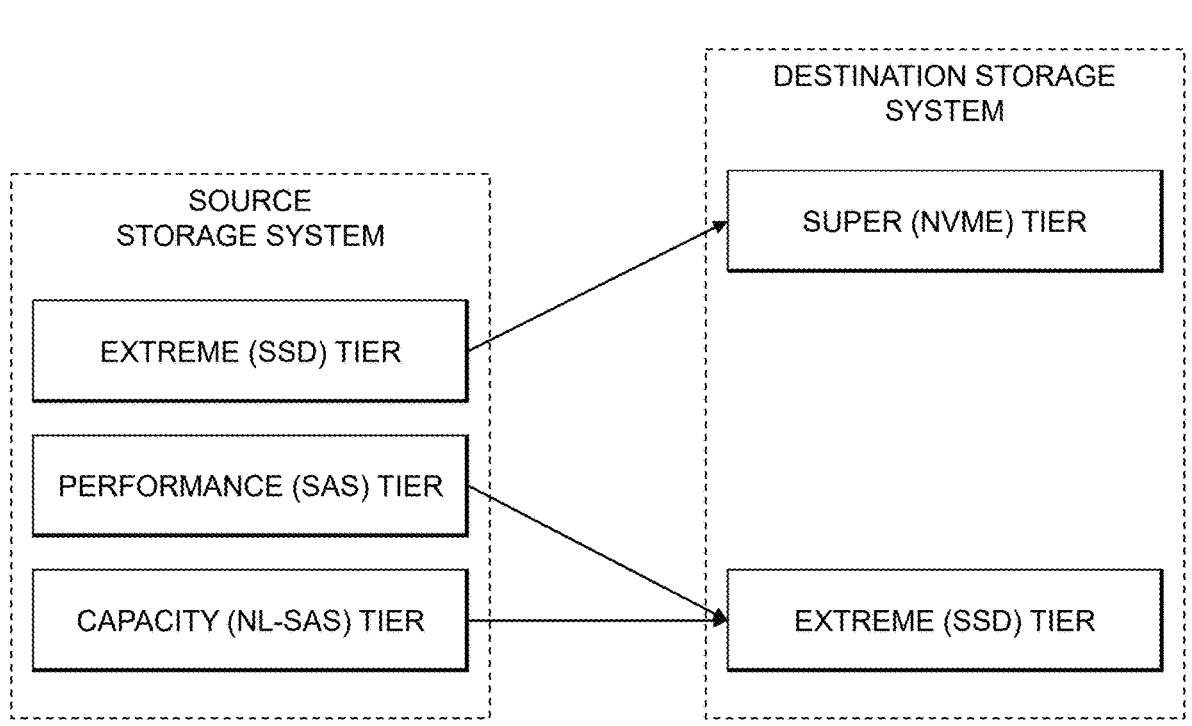
FIG. 10 shows another example of tier mapping rules for tiering-aware replication between source and destination storage systems having different storage tiers in an illustrative embodiment.

Tier mapping policies, also referred to as tier mapping rules, may be used to map between storage tiers of a source storage system and storage tiers of a destination storage system. The tier mapping policies or rules may also specify IO redirection in the event that a target storage tier of the destination storage system is full. During the replication plan phase, tier mapping is determined to account for instances where source and destination storage systems have different numbers of storage tiers, or where storage tiers of source and destination storage systems have different capacities. When there are different tiers in the replication source and destination storage systems, a tier mapping layer may be added at the destination side. In the tier mapping layer, rules or policies are defined which allow users to decide how to do tier mapping between the source and destination storage systems. The tier mapping rules or policies may be customized by users. FIGS. 9 and 10 show examples of tier mapping rules 900 and 1000, respectively, for tiering-aware replication between source and destination storage systems having different numbers and types of storage tiers. The tier mapping rules should take the capacity of storage tiers at the source and destination storage systems into consideration while planning the replication.

The tier mapping rules 900 of FIG. 9 show an example where the source storage system has three storage tiers (an "Extreme" storage tier using SSDs, a "Performance" storage tier using SAS drives, and a "Capacity" storage tier using NL-SAS drives) and where the destination storage system has four storage tiers (a "Super" storage tier using NVMe drives, an "Extreme" storage tier using SSDs, a "Performance" storage tier using SAS drives, and a "Capacity" storage tier using NL-SAS drives). In the tier mapping rules 900, the "Extreme" storage tier of the source storage system is mapped to the "Super" storage tier of the destination storage system, the "Performance" storage tier of the source storage system is mapped to the "Extreme" storage tier of the destination storage system, and the "Capacity" storage tier of the source storage system is mapped to the "Capacity" storage tier of the destination storage system.

The tier mapping rules 1000 of FIG. 10 show an example where the source storage system has three storage tiers (an "Extreme" storage tier using SSDs, a "Performance" storage tier using SAS drives, and a "Capacity" storage tier using NL-SAS drives) and where the destination storage system has two storage tiers (a "Super" storage tier using NVMe drives and an "Extreme" storage tier using SSDs). In the tier mapping rules 1000, the "Extreme" storage tier of the source storage system is mapped to the "Super" storage tier of the destination storage system, while the "Performance" and "Capacity" storage tiers of the source storage system are mapped to the "Extreme" storage tier of the destination storage system.

Figure 11:
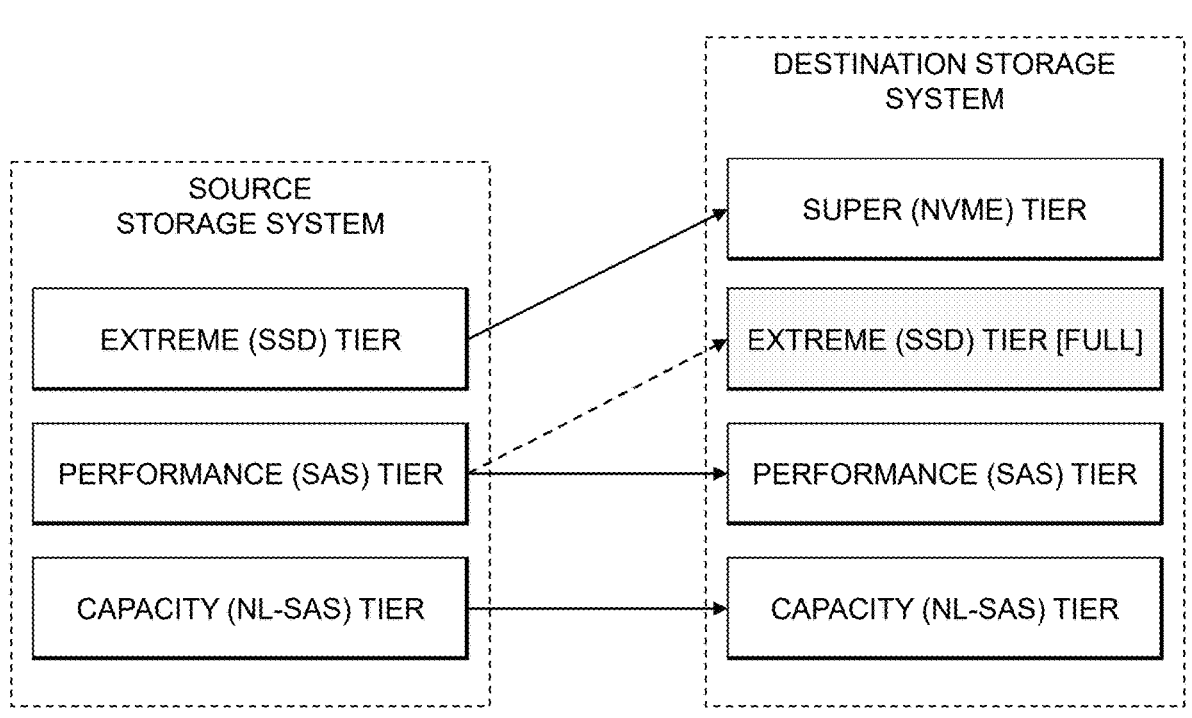
FIG. 11 shows an example of tier mapping rules with redirection due to a target storage tier of a destination storage system being full in an illustrative embodiment.

During the process of tiering-aware block writing at the destination storage system, it is possible that one or more of the storage tiers of the destination storage system do not have enough space to store all of the data that is to be written to those storage tiers as specified by the tier mapping rules. In such cases, the tier mapping rules may specify "redirection" policies or rules to redirect writes to other storage tiers (referred to as "sibling" storage tiers) that have enough space to continue the write process. FIG. 11 shows an example of tier mapping rules 1100 with redirection, where the source storage system has three storage tiers (an "Extreme" storage tier using SSDs, a "Performance" storage tier using SAS drives, and a "Capacity" storage tier using NL-SAS drives) and where the destination storage system has four storage tiers (a "Super" storage tier using NVMe drives, an "Extreme" storage tier using SSDs, a "Performance" storage tier using SAS drives, and a "Capacity" storage tier using NL-SAS drives). The default behavior for the tier mapping rules 1100 is the same as the tier mapping rules 900, where the "Extreme" storage tier of the source storage system is mapped to the "Super" storage tier of the destination storage system, the "Performance" storage tier of the source storage system is mapped to the "Extreme" storage tier of the destination storage system, and the "Capacity" storage tier of the source storage system is mapped to the "Capacity" storage tier of the destination storage system. If, however, the "Extreme" storage tier of the destination storage system becomes full, data blocks from the "Performance" storage tier of the source storage system may be redirected to the "Performance" storage tier of the destination storage system.

The technical solutions described herein enable tiering-aware replication between storage systems having multiple storage tiers (e.g., replication from a source site to a destination site). The replication may be performed for backup or disaster recovery purposes, for migrating an application workload from an older to a newer storage system, etc. Data distribution among the storage tiers at the source storage system (e.g., based on user data activity at the source side) could be kept at the destination storage system (e.g., to the extent possible, subject to the capacity restrictions of storage tiers at the destination storage system and any appliable tier mapping and redirection policies). The tiering-aware replication is thus able to maintain or provide more consistent storage service quality between source and destinations sites in asynchronous and other replication processes, ensuring that user application performance at the destination site is not impacted by the replication process. This provides various technical advantages, including where asynchronous replication is used as a data migration method (e.g., for migrating from an "old" to a "new" storage system) and it is desired to keep data tiering after the replication. During and after tiering-aware replication, unnecessary data relocation (e.g., among storage tiers of the destination storage system) is also advantageously avoided, which provides benefits through reduced wear leveling (e.g., in flash storage tiers which utilize flash or SSD devices impacted by wear leveling).

FIG. 12 shows a system 1200, in which tiering-aware inter-storage system asynchronous replication 1210 is performed between a storage pool 1201 on a source storage system and a storage pool 1251 on a destination storage system. Like the system 500 of FIG. 5, the storage pool 1201 on the source storage system comprises a flash tier 1203

(e.g., an Extreme Performance Tier), a SAS tier 1205 (e.g., a Performance Tier) and a NL-SAS tier 1207 (e.g., a Capacity Tier), and the storage pool 1251 on the destination storage system comprises a flash tier 1253 (e.g., an Extreme Performance Tier), a SAS tier 1255 (e.g., a Performance Tier) and a NL-SAS tier 1257 (e.g., a Capacity Tier). As shown in FIG. 12, the storage pool 1201 on the source storage system is balanced, in that intra-storage system data relocation (e.g., FAST-VP functionality) has been performed such that the data stored on the different storage tiers 1203, 1205 and 1207 is balanced according to the activity levels of the data, with the most active data stored on the flash tier 1203, data with neutral activity stored on the SAS tier 1205, and with the least active data stored on the NL-SAS tier 1207. Since the tiering-aware inter-storage system asynchronous replication 1210 is "tiering-aware", the tiering information for the storage pool 1201 on the source storage system is taken into account (e.g., via tiering flags or other tiering information that is transferred along with data blocks replicated between the storage pool 1201 on the source storage system and the storage pool 1251 on the destination storage system) such that the data when written to the storage pool 1251 of the storage system remains balanced among the different storage tiers 1253, 1255 and 1257 as illustrated. Thus, intra-storage system data relocation (e.g., FAST-VP functionality) will not need to be performed at the destination storage system following the tiering-aware inter-storage system asynchronous replication 1210.

The technical solutions provide improvements for replication processes performed between source and destination storage systems that have multiple storage tiers. Through implementing tiering-aware replication based on data distribution information from the replication source side (e.g., a source storage system), data that is replicated to the replication destination side (e.g., a destination storage system) can maintain the data distribution among the available storage tiers at the replication destination side. Tier mapping and redirection rules or policies may be used in some embodiments to customize data placement in storage tiers at the destination site (e.g., including where the source and destination sites or storage systems have different numbers and/or types of storage tiers, have storage tiers with different capacities, etc.). Customized user data tiering information may be preserved to help the user have stable IO performance after replication, while also reducing wear leveling in storage tiers which utilize storage devices that are affected by wear leveling (e.g., flash storage, SSDs, etc.), as data slice relocation can be avoided or minimized after the replication process.

The technical solutions described herein may be implemented in various multiple-tier storage systems through suitable implementation of tiering-aware replication logic. Conventional replication approaches, as discussed above, are not aware of and do not take into account tiering information. The data distribution among storage tiers, which is an important data characteristic for user data, is dropped or ignored while performing replication. The technical solutions enable data tiering information to be used and taken into account while performing replication, giving users the option of retaining tiering information to ensure storage system performance and reduce wear leveling.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for tiering-aware replication for multiple-tier storage systems will now be described in greater detail with reference to FIGS. 13 and 14. Although described in the context of system 100, these platforms may also be used to implement at least portions of other information processing systems in other embodiments.

Figure 13:
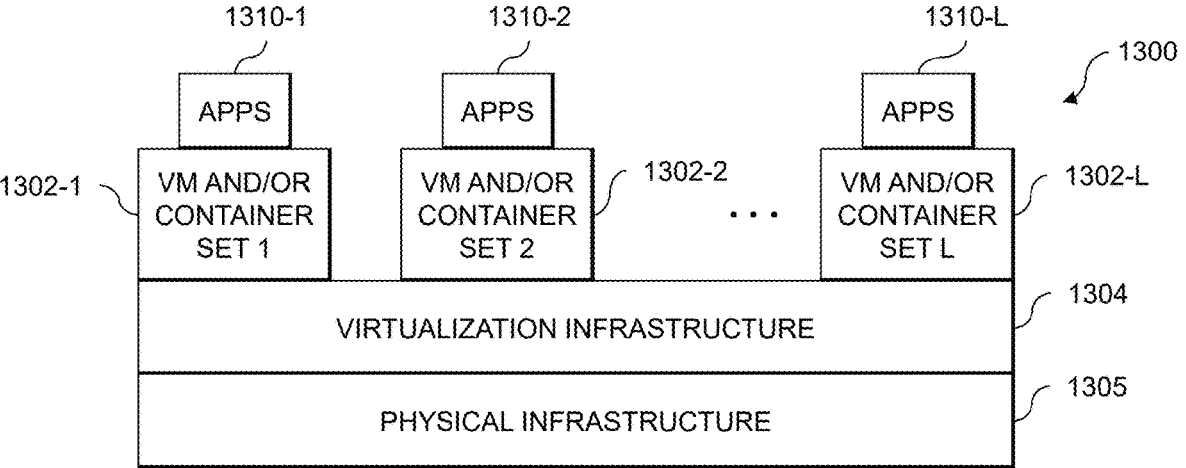
FIGS. 13 and 14 show examples of processing platforms that may be utilized to implement at least a portion of an information processing system in illustrative embodiments.
Figure 14:
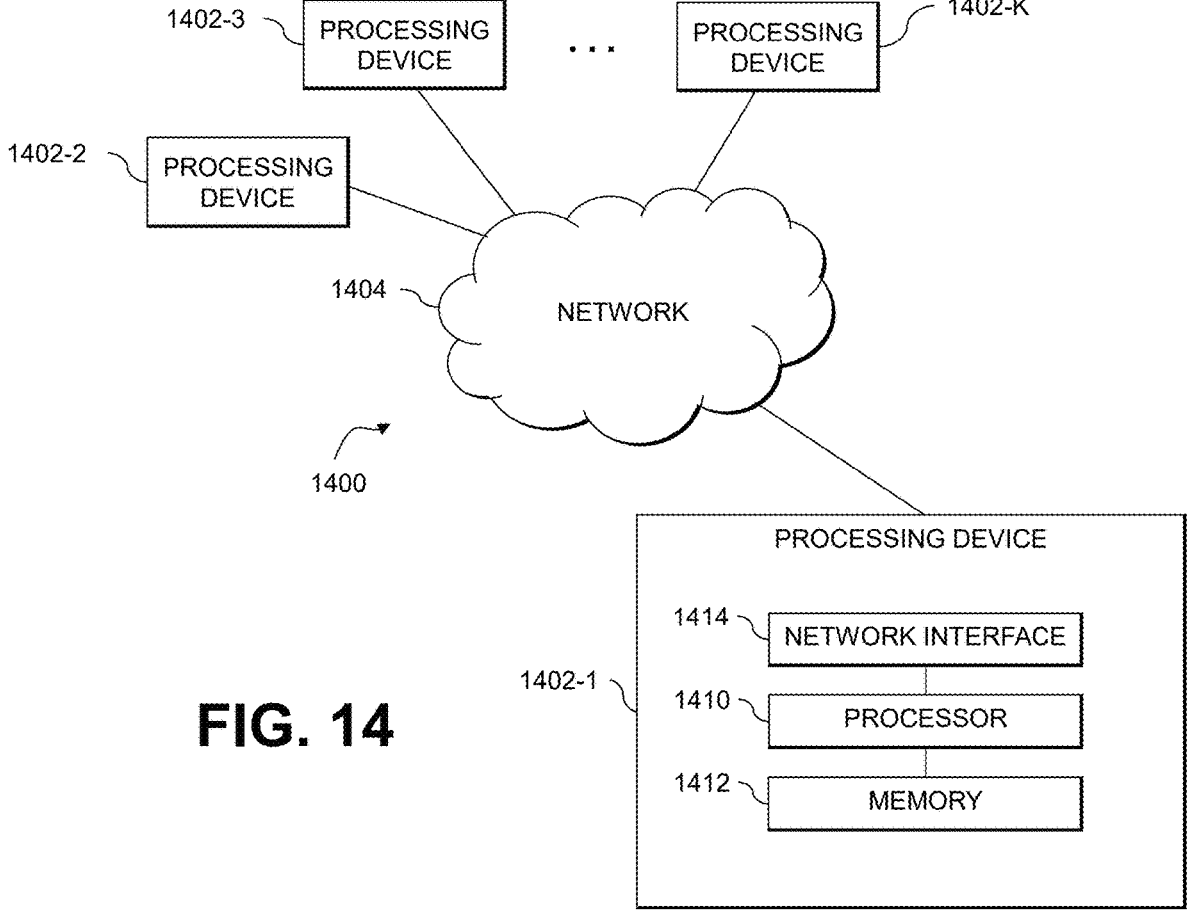

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for tiering-aware replication for multiple-tier storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to determine, for a given portion of data to be replicated from a first storage system comprising a first set of two or more storage tiers to a second storage system comprising a second set of two or more storage tiers, tiering information characterizing a given storage tier of the first set of two or more storage tiers of the first storage system in which the given portion of data is stored, the given storage tier in which the given portion of data is stored being based at least in part on data activity associated with the given portion of data, the given storage tier providing a first performance level;
to generate a tiering flag based at least in part on the determined tiering information, the tiering flag specifying the given storage tier of the first set of two or more storage tiers of the first storage system in which the given portion of the data is stored;
to transfer, from the first storage system to the second storage system, an input-output request packet comprising the given portion of data and the tiering flag associated with the given portion of data;
to select, based at least in part on (i) parsing the tiering flag associated with the given portion of data in the input-output request packet and (ii) one or more storage tier mapping policies mapping storage tiers in the first set of two or more storage tiers of the first storage system to storage tiers in the second set of two or more storage tiers of the second storage system, one of the storage tiers in the second set of two or more storage tiers of the second storage system in which to store the given portion of data, the selected one of the storage tiers in the second set of two or more storage tiers of the second storage system providing a second performance level that the one or more storage tier mapping policies maps to the first performance level of the given storage tier of the first storage system; and
to replicate the given portion of data from the given storage tier of the first set of two or more storage tiers of the first storage system to the selected one of the storage tiers in the second set of two or more storage tiers of the second storage system.

2. The apparatus of claim 1 wherein the first set of two or more storage tiers of the first storage system is different than the second set of two or more storage tiers of the second storage system.

3. The apparatus of claim 1 wherein a first number of storage tiers in the first set of two or more storage tiers of the first storage system is less than a second number of storage tiers in the second set of two or more storage tiers of the second storage system.

4. The apparatus of claim 1 wherein a first number of storage tiers in the first set of two or more storage tiers of the first storage system is greater than a second number of storage tiers in the second set of two or more storage tiers of the second storage system.

5. The apparatus of claim 1 wherein the second performance level is different than the first performance level.

6. The apparatus of claim 1 wherein the one or more storage tier mapping policies map a first storage tier of the first set of two or more storage tiers of the first storage system utilizing a first type of storage device to a second storage tier of the second set of two or more storage tiers of the second storage system utilizing a second type of storage device, the second type of storage device being different than the first type of storage device.

7. The apparatus of claim 1 wherein the one or more storage tier mapping policies map a first storage tier and a second storage tier of the first set of two or more storage tiers of the first storage system to a same storage tier of the second set of two or more storage tiers of the second storage system providing the second performance level.

8. The apparatus of claim 1 wherein the one or more storage tier mapping policies specifies a prioritized ordering for mapping the given storage tier of the first set of two or more storage tiers of the first storage system to two or more different ones of the storage tiers of the second set of two or more storage tiers of the second storage system.

9. The apparatus of claim 8 wherein selecting the one of the storage tiers in the second set of two or more storage tiers of the second storage system in which to store the given portion of data comprises determining whether a first one of the two or more different ones of the storage tiers of the second set of two or more storage tiers of the second storage system in the prioritized ordering has available storage capacity for storing the given portion of data.

10. The apparatus of claim 9 wherein selecting the one of the storage tiers in the second set of two or more storage tiers of the second storage system in which to store the given portion of data comprises:

responsive to determining that the first one of the two or more different ones of the storage tiers of the second set of two or more storage tiers of the second storage system in the prioritized ordering has available storage capacity for storing the given portion of data, selecting the first one of the two or more different ones of the storage tiers of the second set of two or more storage tiers of the second storage system; and responsive to determining that the first one of the two or more different ones of the storage tiers of the second set of two or more storage tiers of the second storage system in the prioritized ordering does not have available storage capacity for storing the given portion of data, selecting a second one of the two or more different ones of the storage tiers of the second set of two or more storage tiers of the second storage system.

11. The apparatus of claim 1 wherein the given portion of data is to be replicated from the first storage system to the second storage system as part of an asynchronous replication process.

12. The apparatus of claim 1 wherein the given portion of data is also replicated from the first storage system comprising the first set of one or more storage tiers to a third storage system comprising a third set of two or more storage tiers, wherein the given portion of data is replicated from the given storage tier of the first set of two or more storage tiers of the first storage system to a selected one of the storage tiers in the third set of two or more storage tiers of the third storage system.

13. The apparatus of claim 12 wherein the selected one of the storage tiers in the third set of two or more storage tiers of the third storage system provides a different performance level than the selected one of the storage tiers in the second set of two or more storage tiers of the second storage system.

14. A computer program product comprising a non-transitory processor-readable storage medium having stored therein program code of one or more software programs, wherein the program code when executed by at least one processing device causes the at least one processing device:

to determine, for a given portion of data to be replicated from a first storage system comprising a first set of two or more storage tiers to a second storage system comprising a second set of two or more storage tiers, tiering information characterizing a given storage tier of the first set of two or more storage tiers of the first storage system in which the given portion of data is stored, the given storage tier in which the given portion of data is stored being based at least in part on data activity associated with the given portion of data, the given storage tier providing a first performance level;

to generate a tiering flag based at least in part on the determined tiering information, the tiering flag specifying the given storage tier of the first set of two or more storage tiers of the first storage system in which the given portion of the data is stored;

to transfer, from the first storage system to the second storage system, an input-output request packet comprising the given portion of data and the tiering flag associated with the given portion of data;

to select, based at least in part on (i) parsing the tiering flag associated with the given portion of data in the input-output request packet and (ii) one or more storage tier mapping policies mapping storage tiers in the first set of two or more storage tiers of the first storage system to storage tiers in the second set of two or more storage tiers of the second storage system, one of the storage tiers in the second set of two or more storage tiers of the second storage system in which to store the given portion of data, the selected one of the storage tiers in the second set of two or more storage tiers of the second storage system providing a second performance level that the one or more storage tier mapping policies maps to the first performance level of the given storage tier of the first storage system; and to replicate the given portion of data from the given storage tier of the first set of two or more storage tiers of the first storage system to the selected one of the storage tiers in the second set of two or more storage tiers of the second storage system.

15. The computer program product of claim 14 wherein the first set of two or more storage tiers of the first storage system is different than the second set of two or more storage tiers of the second storage system.

16. The computer program product of claim 14 wherein the one or more storage tier mapping policies specifies a prioritized ordering for mapping the given storage tier of the first set of two or more storage tiers of the first storage system to two or more different ones of the storage tiers of the second set of two or more storage tiers of the second storage system.

17. A method comprising:

determining, for a given portion of data to be replicated from a first storage system comprising a first set of two or more storage tiers to a second storage system comprising a second set of two or more storage tiers, tiering information characterizing a given storage tier of the first set of two or more storage tiers of the first storage system in which the given portion of data is stored, the given storage tier in which the given portion of data is stored being based at least in part on data activity associated with the given portion of data, the given storage tier providing a first performance level;

generating a tiering flag based at least in part on the determined tiering information, the tiering flag specifying the given storage tier of the first set of two or more storage tiers of the first storage system in which the given portion of the data is stored;

transferring, from the first storage system to the second storage system, an input-output request packet comprising the given portion of data and the tiering flag associated with the given portion of data;

selecting, based at least in part on (i) parsing the tiering flag associated with the given portion of data in the input-output request packet and (ii) one or more storage tier mapping policies mapping storage tiers in the first set of two or more storage tiers of the first storage system to storage tiers in the second set of two or more storage tiers of the second storage system, one of the storage tiers in the second set of two or more storage tiers of the second storage system in which to store the given portion of data, the selected one of the storage tiers in the second set of two or more storage tiers of the second storage system providing a second performance level that the one or more storage tier mapping policies maps to the first performance level of the given storage tier of the first storage system; and replicating the given portion of data from the given storage tier of the first set of two or more storage tiers of the first storage system to the selected one of the storage tiers in the second set of two or more storage tiers of the second storage system;

wherein the method is performed by at least one processing device comprising a processor coupled to a memory.

18. The method of claim 17 wherein the first set of two or more storage tiers of the first storage system is different than the second set of two or more storage tiers of the second storage system.

19. The method of claim 17 wherein the one or more storage tier mapping policies specifies a prioritized ordering for mapping the given storage tier of the first set of two or more storage tiers of the first storage system to two or more different ones of the storage tiers of the second set of two or more storage tiers of the second storage system.

20. The method of claim 19 wherein selecting the one of the storage tiers in the second set of two or more storage tiers of the second storage system in which to store the given portion of data comprises determining whether a first one of the two or more different ones of the storage tiers of the second set of two or more storage tiers of the second storage system in the prioritized ordering has available storage capacity for storing the given portion of data.

* * * * *